(12) United States Patent
Wetterwald et al.

(10) Patent No.: US 10,389,619 B2
(45) Date of Patent: Aug. 20, 2019

(54) WIRELESS BYPASS OF NEXT-HOP DEVICE IN SOURCE ROUTE PATH

(71) Applicant: Cisco Technology, Inc., San Jose, CA (US)

(72) Inventors: Patrick Wetterwald, Mouans Sartoux (FR); Pascal Thubert, La Colle sur Loup (FR); Eric Michel Levy-Abegnoli, Valbonne (FR); Jean-Philippe Vasseur, Saint Martin d'Uriage (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 310 days.

(21) Appl. No.: 15/359,739

(22) Filed: Nov. 23, 2016

(65) Prior Publication Data

US 2018/0146413 A1    May 24, 2018

(51) Int. Cl.
*H04L 12/721*    (2013.01)
*H04W 84/18*    (2009.01)
*H04L 12/733*    (2013.01)
*H04L 29/06*    (2006.01)

(52) U.S. Cl.
CPC .............. *H04L 45/14* (2013.01); *H04L 45/20* (2013.01); *H04L 45/34* (2013.01); *H04W 84/18* (2013.01); *H04L 69/22* (2013.01); *Y02D 70/00* (2018.01); *Y02D 70/144* (2018.01)

(58) Field of Classification Search
CPC ......... H04L 45/14; H04L 45/34; H04L 69/22; H04L 45/20; Y02D 70/144; Y02D 70/00; H04W 84/18
See application file for complete search history.

(56) References Cited

U.S. PATENT DOCUMENTS

| 7,533,159 B1 * | 5/2009 | Jones .................. H04L 12/1886 709/220 |
| 7,778,235 B2 | 8/2010 | Thubert et al. |
| 8,331,240 B2 | 12/2012 | Voglewede et al. |
| 9,350,683 B2 | 5/2016 | Hui et al. |
| 9,386,504 B2 | 7/2016 | Yoon |
| 9,413,479 B2 | 8/2016 | Wetterwald et al. |
| 2014/0129734 A1 * | 5/2014 | Vasseur ................ H04L 45/121 709/241 |

(Continued)

OTHER PUBLICATIONS

Afanasyev et al, Efficient through Eavesdropping: Link-Layer Packet Caching, 2008, NSDI 08: 5th USENIX Symposium on Networked System Design and Implementation, p. 105-118 (Year: 2008).*

(Continued)

*Primary Examiner* — Mounir Moutaouakil

(74) *Attorney, Agent, or Firm* — Leon R. Turkevich

(57) ABSTRACT

In one embodiment, a method comprises promiscuously detecting, by a network device in a wireless data network, a wireless data packet comprising a source route header specifying a hop-by-hop path for reaching a destination device in the wireless data network; determining, by the network device, that the network device is identified in the hop-by-hop path as following a first next-hop device targeted for reception of the wireless data packet; and executing intercepted forwarding of the wireless data packet, by the network device, to a second next-hop device successively following the network device in the hop-by-hop path.

15 Claims, 4 Drawing Sheets

(56) References Cited

U.S. PATENT DOCUMENTS

| | | | |
|---|---|---|---|
| 2016/0020979 A1 | 1/2016 | Thubert et al. | |
| 2016/0269096 A1 | 9/2016 | Thubert et al. | |
| 2017/0041231 A1* | 2/2017 | Seed | H04W 4/70 |
| 2018/0332047 A1* | 11/2018 | Shah | H04L 63/20 |

OTHER PUBLICATIONS

Thubert et al., U.S. Appl. No. 15/009,872, filed Jan. 29, 2016.
Thubert et al., U.S. Appl. No. 15/171,518, filed Jun. 2, 2016.
Thubert, Ed., "An Architecture for IPv6 over the TSCH mode of IEEE 802.15.4", [online], Jun. 10, 2016, [retrieved on Sep. 6, 2016]. Retrieved from the Internet: <URL: https://tools.ietf.org/pdf/draft-ietf-6tisch-architecture-10.pdf>, pp. 1-49.
Vilajosana, Ed., et al., "Minimal 6TiSCH Configuration", [online], Jun. 28, 2016, [retrieved on Sep. 6, 2016]. Retrieved from the Internet: <URL: https://tools.ietf.org/pdf/draft-ietf-6tisch-minimal-16.pdf>, pp. 1-28.
Palattella, Ed., et al., "Terminology in IPv6 over the TSCH mode of IEEE 802.15.4e", [online], Mar. 21, 2016, [retrieved on Sep. 6, 2016]. Retrieved from the Internet: <URL: https://tools.ietf.org/pdf/draft-ietf-6tisch-terminology-07.pdf>, pp. 1-14.
Thubert, Ed., et al., "Root initiated routing state in RPL", [online], Nov. 2, 2015, [retrieved on Sep. 6, 2016]. Retrieved from the Internet: <URL: https://tools.ietf.org/pdf/draft-thubert-roll-dao-projection-02.pdf>, pp. 1-14.
Winter, Ed., et al., "RPL: IPv6 Routing Protocol for Low-Power and Lossy Networks", Internet Engineering Task Force (IETF), Request for Comments: 6550, Mar. 2012, pp. 1-157.
Hui et al., "An IPv6 Routing Header for Source Routes with the Routing Protocol for Low-Power and Lossy Networks (RPL)", Internet Engineering Task Force (IETF), Request for Comments: 6554, Mar. 2012, pp. 1-13.
Watteyne, Ed., et al., "Using IEEE 802.15.4e Time-Slotted Channel Hopping (TSCH) in the Internet of Things (IOT): Problem Statement", Internet Engineering Task Force (IETF), Request for Comments: 7554, May 2015, pp. 1-23.
Thubert et al., "IETF 6TSCH: Combining IPv6 Connectivity with Industrial Performance", 2013 Seventh International Conference on Innovative Mobile and Internet Services in Ubiquitous Computing, IEEE 2016, pp. 541-546.

* cited by examiner

WIRELESS BYPASS OF NEXT-HOP DEVICE IN SOURCE ROUTE PATH

TECHNICAL FIELD

The present disclosure generally relates to wireless bypass of a next-hop device in a source route path.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

A Low-power and Lossy Network (LLN) is a network that can include dozens or thousands of low-power router devices configured for routing data packets according to a routing protocol designed for such low power and lossy networks (RPL): such low-power router devices can be referred to as "RPL nodes". Each RPL node in the LLN typically is constrained by processing power, memory, and energy (e.g., battery power); interconnecting links between the RPL nodes typically are constrained by high loss rates, low data rates, and instability with relatively low packet delivery rates. A network topology (a "RPL instance") can be established based on creating routes in the form of a directed acyclic graph (DAG) toward a single "root" network device, also referred to as a "DAG root" or a "DAG destination". Hence, the DAG also is referred to as a Destination Oriented DAG (DODAG). Network traffic moves either "up" towards the DODAG root or "down" towards the DODAG leaf nodes.

A RPL DODAG root for a DODAG operating in non-storing mode can use a source routing header for data packets sent down from the DODAG root to an identified destination in the source routing header. A source route header also can be used to route a data packet from one network device in the DODAG to another network device in the DODAG.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
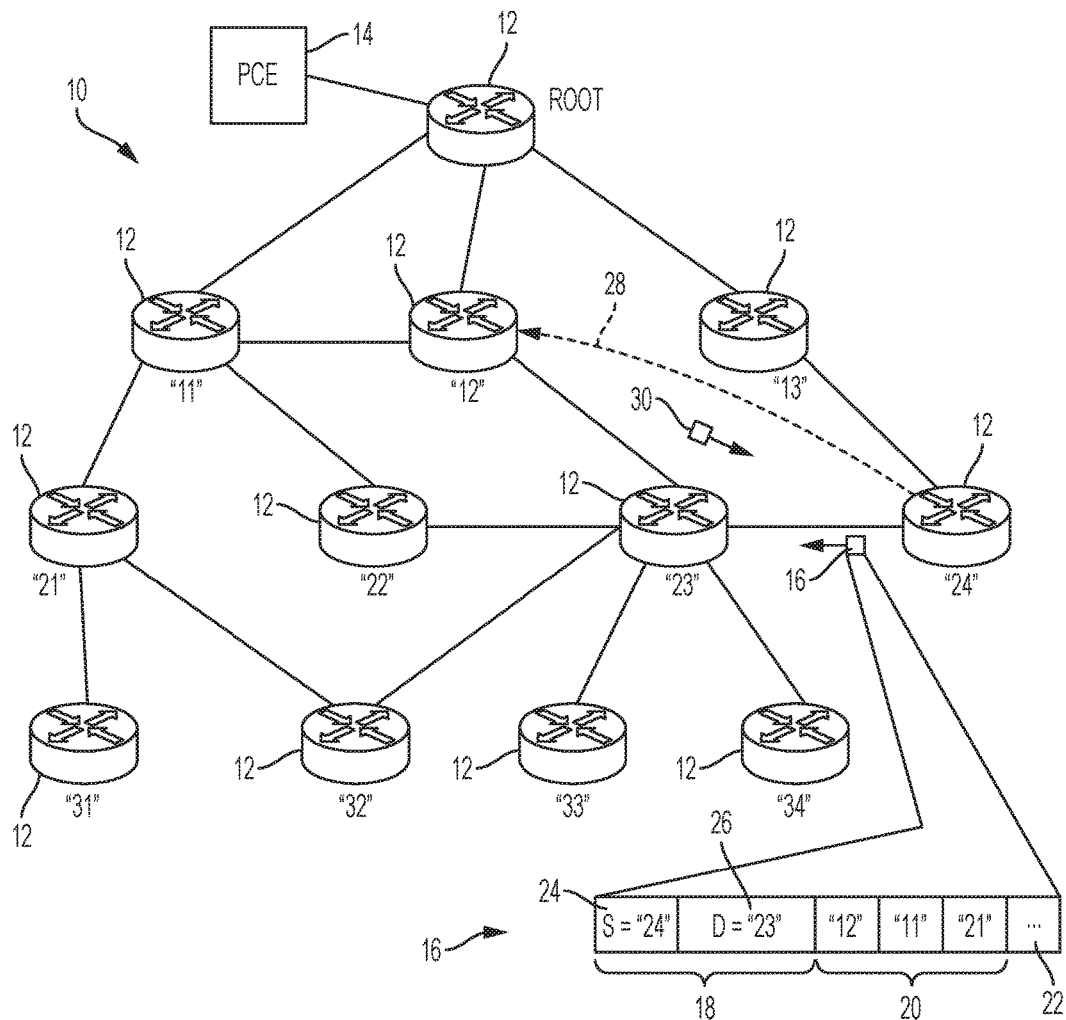
FIG. 1 illustrates a tree-based network comprising an example apparatus configured for executing promiscuous detection and intercepted forwarding of a data packet in response to detecting the apparatus is identified in a hop-by-hop source route path, following a next-hop device targeted for reception of the wireless data packet, according to an example embodiment.

In one embodiment, a method comprises promiscuously detecting, by a network device in a wireless data network, a wireless data packet comprising a source route header specifying a hop-by-hop path for reaching a destination device in the wireless data network; determining, by the network device, that the network device is identified in the hop-by-hop path as following a first next-hop device targeted for reception of the wireless data packet; and executing intercepted forwarding of the wireless data packet, by the network device, to a second next-hop device successively following the network device in the hop-by-hop path.

In another embodiment, an apparatus comprises a device interface circuit and a processor circuit. The device interface circuit is configured for promiscuously detecting, in a wireless data network, a wireless data packet comprising a source route header specifying a hop-by-hop path for reaching a destination device in the wireless data network. The processor circuit is configured for determining that the apparatus is identified in the hop-by-hop path as following a first next-hop device targeted for reception of the wireless data packet. The processor circuit further is configured for executing intercepted forwarding of the wireless data packet to a second next-hop device successively following the apparatus in the hop-by-hop path.

In another embodiment, one or more non-transitory tangible media are encoded with logic for execution by a machine and when executed by the machine operable for: promiscuously detecting, by machine implemented as a network device in a wireless data network, a wireless data packet comprising a source route header specifying a hop-by-hop path for reaching a destination device in the wireless data network; determining, by the network device, that the network device is identified in the hop-by-hop path as following a first next-hop device targeted for reception of the wireless data packet; and executing intercepted forwarding of the wireless data packet, by the network device, to a second next-hop device successively following the network device in the hop-by-hop path.

DETAILED DESCRIPTION

Particular embodiments enable a network device in a wireless data network (e.g., a RPL-based network having a DODAG topology) to promiscuously detect a wireless data packet transmitted to a targeted network device, and execute intercepted forwarding of the wireless data packet toward a destination on behalf of the targeted network device, in response to the network device detecting that it is identified as "downstream" of the targeted network device in a hop-by-hop source route path specified within a source route header in the wireless data packet. The intercepted forwarding enables the targeted network device to suppress transmission of the wireless data packet and thereby conserve energy.

Hence, the example embodiments enable the transmission of the wireless data packet based on the corresponding source route header, while eliminating unnecessary transmissions within the hop-by-hop path specified in the source route header.

FIG. 1 is a diagram illustrating an example wireless data network 10 having wireless network devices 12, for example RPL nodes, according to an example embodiment. The wireless data network 10 also can include a controller 14, for example a path computation element (PCE) 14, that is configured for providing control and/or management operations such as scheduling transmissions in the wireless data network 10, described below.

Each apparatus 12, 14 is a physical machine (i.e., a hardware device) configured for implementing network communications with other physical machines via wireless data links in the wireless data network 10. The term "configured for" or "configured to" as used herein with respect to a specified operation refers to a device and/or machine that is physically constructed and arranged to perform the specified operation. Hence, each apparatus 12, 14 is a network-enabled (user machine providing user access to a network)/machine implementing network communications via the wireless data network 10.

The wireless data network 10 can be implemented as having a tree-based topology (e.g., a DODAG) having a network device "Root" 12 serving as a root of the tree-based topology, and "child" devices having one or more attachment links (illustrated by the solid lines in FIG. 1) according to the DODAG topology. As will be apparent, the attachment links can be based on the network devices 12 executing an existing routing protocol, for example RPL as described in the Internet Engineering Task Force (IETF) Request for Comments (RFC) 6550. As illustrated in FIG. 1, the DODAG can be established such that: the network devices "11", "12", and "13" 12 are child network devices of the root network device "Root" 12; the network devices "12", "21", and "22" 12 are child network devices of the network device "11" 12; the network device "23" 12 is a child network device of the network device "12" 12; the network device "24" 12 is a child network device of the network device "13" 12; the network devices "31" and "32" 12 are child network devices of the network device "21" 12; the network device "23" 12 is a child network device of the network device "22" 12; and network devices "24", "33" and "34" 12 are child network devices of the network device "23" 12.

Hence, the DODAG topology implemented in the wireless data network 10 enables any one source network device (e.g., "24") 12 to send a wireless data packet 16 to a destination network device (e.g., "21") 12 via the DODAG topology. RFC 6550 describes a non-storing mode, where only the root network device "Root" 12 stores any routing information for reaching a destination network device 12, and none of the child network devices (e.g., "11" through "34") 12 store any routing information; hence, non-storing mode could require that all network traffic in the wireless data network 10 be forwarded to the root network device 12 for routing to the destination.

The PCE 14 and/or the root network device "Root" 12 also can send to a network device (e.g., "24") 12 a hop-by-hop path source route path (e.g., "23-12-11-21") for reaching a destination network device (e.g., "21") 12, eliminating the necessity of forwarding the wireless data packet 16 to the root network device 12 in cases where the DODAG is implemented in non-storing mode (i.e., where one or more of the network devices 12 do not store route table entries for reaching child network devices). Hence, the source network device "24" 12 can generate and output a wireless data packet 16 that includes an IPv6 header 18, a source routing header 20 specifying the hop-by-hop source-route path for reaching the destination network device "21" 12, payload data 22, etc. As illustrated in FIG. 1, the IPv6 header 18 generated by the source network device "24" 12 can specify a source address field 24 specifying the IPv6 address of the source network device "24" 12, and a destination address field 26 specifying the IPv6 address of the first-hop node "23" 12 that is targeted for reception of the wireless data packet 16.

The source routing header 20 can specify a hop-by-hop source-route path "12-11-21" for reaching the destination network device (e.g., "21") 12, starting with the second hop device (e.g., "12") following the first hop specified in the destination address field 26 (e.g., "23"), and ending with the destination network device (e.g., "21") 12; hence, the first-hop network device "23" 12, in response to receiving the wireless data packet 16 and detecting its IP address in the destination address field 26, can parse the source routing header 20 to determine the second hop device (e.g., "12"), and in response insert the corresponding IPv6 address of the next hop device (e.g., "12") into the destination address field 26 prior to transmission to the targeted device. Hence, the targeted device of the transmission of the wireless data packet 16 can be identified by the corresponding IP address in the destination address field 26.

As described in further detail below, a network device (e.g. "12" or "11") can promiscuously detect the wireless data packet 16 transmitted to the targeted network device "23" 12. In response to promiscuous detection of the wireless data packet 16 (indicated by the dashed line 28), a network device (e.g., "12") (i.e., an intercepting network device) 12 can execute intercepted forwarding of the wireless data packet 16 toward the destination network device "21" 12 on behalf of the targeted network device "23" 12 (i.e., the network device targeted for reception of the wireless data packet 16), in response to the intercepting network device (e.g., "12") 12 detecting that it is identified as "downstream" of the targeted network device "23" 12 in the hop-by-hop source route path "12-11-21" specified in the source routing header 20 of the wireless data packet 16.

The intercepting network device (e.g., "12") 12 can initiate intercepted forwarding by transmitting an intercepting acknowledgement message 30, described below, that can enable the transmitting network device "24" 12 (having transmitted the wireless data packet 16) and the targeted network device "23" 12 to detect that the intercepting network device (e.g., "12") 12 has already received the wireless data packet 16. Hence, the intercepting acknowledgement message 30 enables the targeted network device "23" 12 to suppress the unnecessary transmission of the wireless data packet 16 along the hop-by-hop source route path "12-11-21" and thereby conserve energy.

Figure 2:
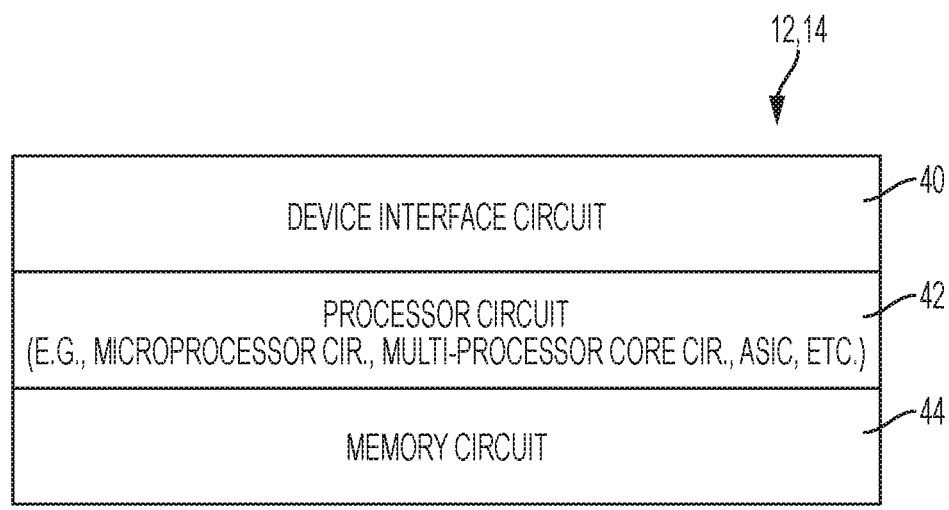
FIG. 2 illustrates an example implementation of any one of the network devices of FIG. 1, according to an example embodiment.

FIG. 2 illustrates an example implementation of any one of the devices 12 and/or 14 of FIG. 1, according to an example embodiment.

Each apparatus 12 and/or 14 can include a device interface circuit 40, a processor circuit 42, and a memory circuit 44. The device interface circuit 40 can include one or more distinct physical layer transceivers for communication with any one of the other devices 12 and/or 14; the device interface circuit 40 also can include an IEEE based Ethernet transceiver for communications with the devices of FIG. 1 via any type of data link (e.g., a wired or wireless link, an optical link, etc.). The processor circuit 42 can be configured for executing any of the operations described herein, and the memory circuit 44 can be configured for storing any data or data packets as described herein.

Any of the disclosed circuits of the devices 12 and/or 14 (including the device interface circuit 40, the processor circuit 42, the memory circuit 44, and their associated components) can be implemented in multiple forms. Example implementations of the disclosed circuits include hardware logic that is implemented in a physical logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit (s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

Figure 3:
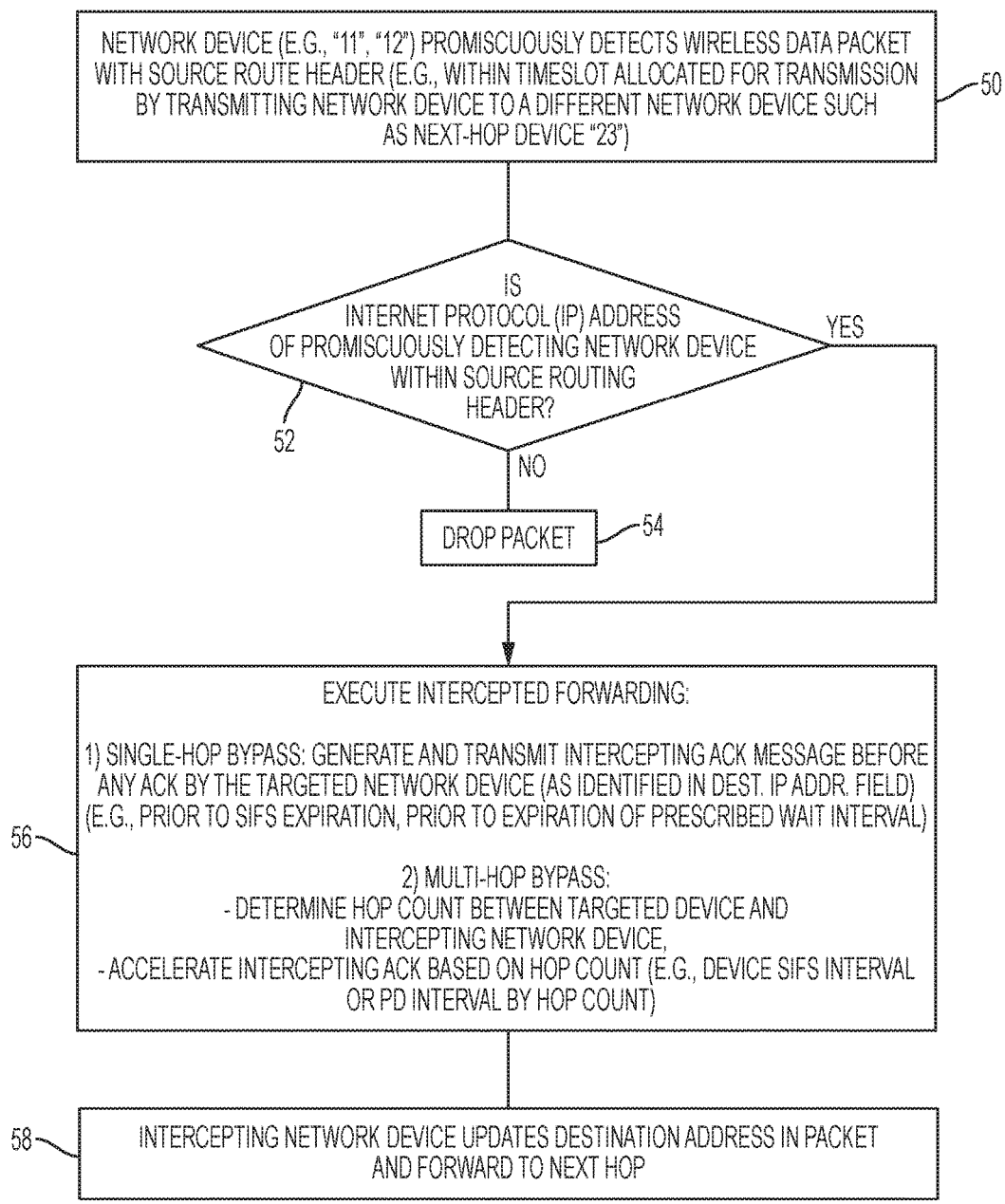
FIG. 3 illustrates an example method of the apparatus of FIG. 1 executing promiscuous detection and intercepted forwarding of a data packet in response to the apparatus detecting identification thereof in a hop-by-hop source route path, following a next-hop device targeted for reception of the wireless data packet, according to an example embodiment.

FIG. 3 illustrates an example method of the apparatus of FIG. 1 executing promiscuous detection and intercepted forwarding of a data packet in response to the apparatus detecting identification thereof in a hop-by-hop source route path, following a next-hop device targeted for reception of the wireless data packet, according to an example embodiment. The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Figure 4A:
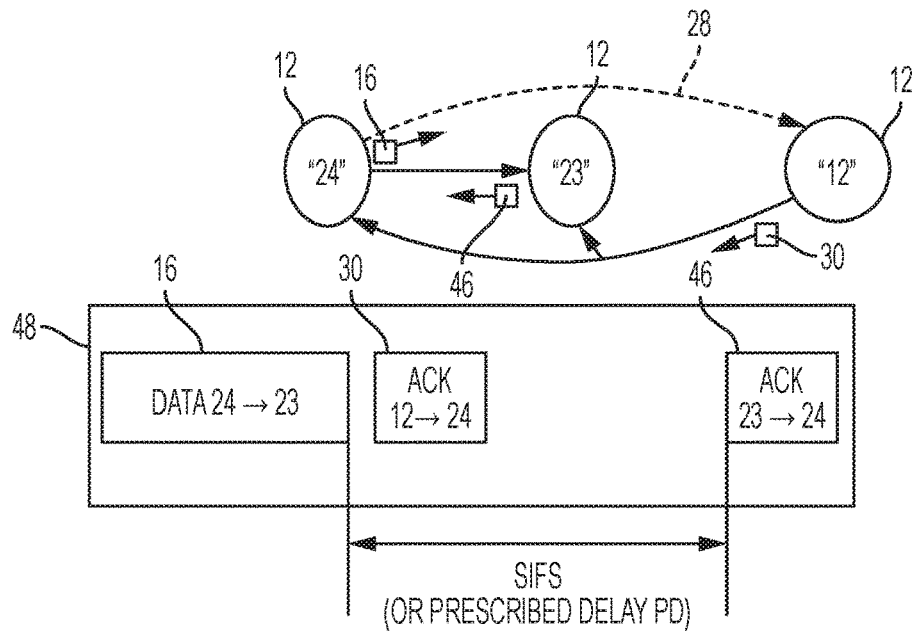
FIGS. 4A and 4B illustrate example intercepting acknowledgement messages in response to the promiscuous detection of the wireless data packet, according to an example embodiment.
Figure 4B:
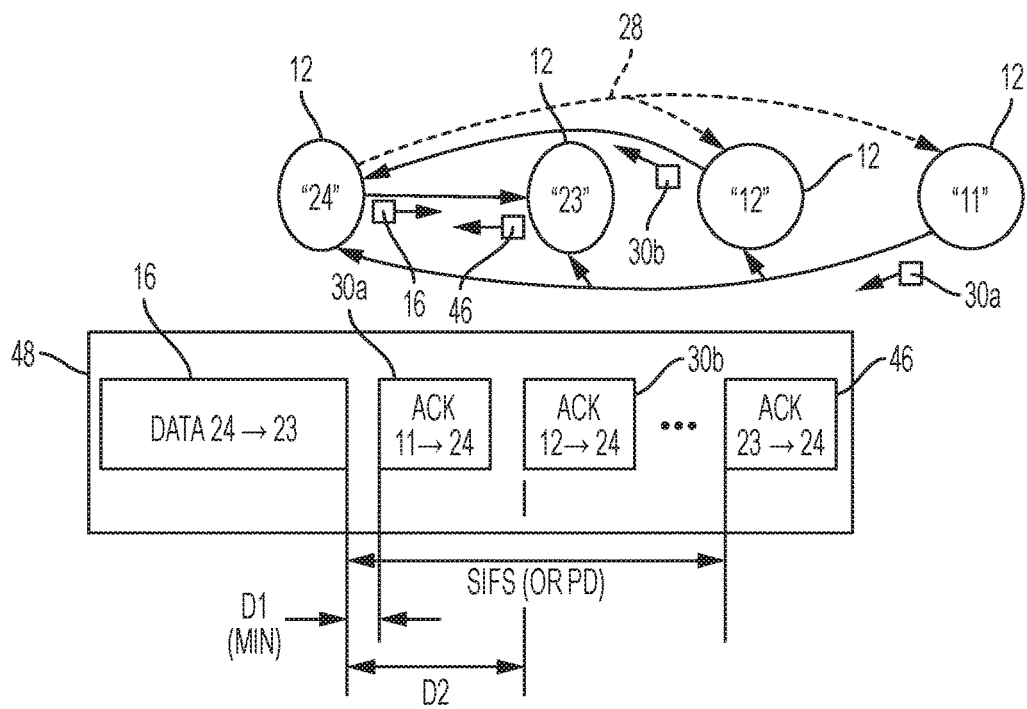

Referring to FIG. 3, the device interface circuit 40 of any one of the network devices 12 (e.g., network devices "11" and/or "12") can be configured for promiscuously detecting in operation 50 the wireless data packet 16 transmitted by the transmitting network device "24" 12 to the targeted network device "23" 12 ("DATA 24→23" of FIGS. 4A and 4B). The term "promiscuous" refers to the ability of the device interface circuit 40 to forward the received wireless data packet 16 for processing (e.g., to the processor circuit 42), regardless of the value specified in the destination address field 26. For example, the device interface circuit 40 of the network devices 12 can be configured for monitoring time slots on one more frequency channels in a 6TiSCH network using time slotted channel hopping (TSCH) based on IEEE 802.15.4e, and thus can detect the wireless data packet 16 within a prescribed timeslot (e.g., 6TiSCH "cell") 48 allocated by the PCE 14 for transmission from the transmitting network device "24" 12 to the next-hop network device "23" 12.

As illustrated in FIG. 1, the wireless data packet 16 comprises a source routing header 20 that specifies a hop-by-hop path "12-11-21" for reaching the destination device "21" 12 in the wireless data network 10. As used herein, the term "hop-by-hop path" can encompass "loose source routing" paths and/or "strict source routing" (i.e., explicit hop-by-hop) paths. Hence, although the hop-by-hop path "12-11-21" for reaching the destination device "21" 12 is a strict source route path that specifies the explicit hop-by-hop sequence of network devices 12 for reaching the destination device "21" 12, the source routing header 20 can specify a loose source route path.

In response to promiscuously detecting (28 in FIGS. 1, 4A, and 4B) in operation 50 the wireless data packet 16 transmitted by the transmitting network device "24" 12, the processor circuit 42 of the promiscuously detecting network device (e.g., "11" and/or "12") 12 in operation 52 can determine whether the wireless data packet 16 includes a source routing header 20 that identifies the promiscuously detecting network device as following the next-hop device "23" targeted for reception of the wireless data packet 16; in other words, the next-hop device "23" targeted for reception is identified by its corresponding IP address in the destination address field 26; a network device 12 can determine whether it is identified as following the next-hop device (identified in the destination address field 26) in the hop-by-hop path based on whether its corresponding IP address is in the source routing header 20. For example, if the network device "13" 12 promiscuously detects the network device 12 in operation 50, its corresponding processor circuit 42 would determine that its corresponding IP address is not in the source routing header 20 (and therefore not part of the hop-by-hop path), and the processor circuit 42 of the network device "13" 12 would drop the wireless data packet 16 in operation 54.

In response to the processor circuit 42 of the promiscuously detecting network device (e.g., "11" and/or "12") determining in operation 52 that the promiscuously detecting network device (e.g., "11" and/or "12") is identified in the hop-by-hop path "12-11-21" as following the next-hop device "23" targeted for reception, the processor circuit 42 of the promiscuously detecting network device (e.g., "11" and/or "12") (hereinafter the "intercepting network device") in operation 56 can initiate executing intercepted forwarding of the wireless data packet 16 to the next-hop device successively following the intercepting network device in the hop-by-hop source route path "12-11-21", enabling the targeted network device "23" 12 to be bypassed in the hop-by-hop source route path.

FIG. 4A illustrates an example "single-hop bypass" that can be executed in operation 56 by an intercepting network device "12" that is one hop away from the targeted network device "12", assuming other "downstream" network devices (e.g. "11") are not configured (or not permitted) to execute multi-hop bypass, described below. The processor circuit 42 of the intercepting network device (e.g., "12") in operation 56 can initiate execution of the intercepted forwarding by causing the targeted network device "23" 12 to suppress transmission of the wireless data packet 16, based on the processor circuit 42 of the intercepting network device (e.g., "12") generating and outputting (for transmission by the corresponding device interface circuit 40) an intercepting acknowledgement message (e.g., "ACK 12→24" of FIG. 4A) 30 before any corresponding acknowledgement ("ACK 23→24" 46 of FIG. 4A) by the targeted network device "23" 12. The intercepting acknowledgement message 30 can indicate reception by the intercepting network device "12" 12 of the wireless data packet 30 transmitted by the transmitting network device "24" 12, for example by explicitly identifying within the intercepting acknowledgement message 30 the transmitting network device "24" and the intercepting network device "12" (e.g., "ACK 23→24").

The processor circuit 42 of the intercepting network device (e.g., "12") 12 can output the intercepting acknowledgement message 30 in operation 56 prior to the earliest transmission of the acknowledgement "ACK 23→24" 46, for example prior to expiration of a short interframe spacing (SIFS) interval following completed transmission of the wireless data packet "DATA 24→23" 16 in a carrier sense multiple access with collision avoidance (CSMA-CA) network, or before expiration of a prescribed acknowledgement interval "PD" allocated for the targeted network device "23" 12 in a prescribed timeslot such as a TSCH or 6TiSCH timeslot 48 allocated by the PCE 14.

Hence, the targeted network device "23" 12 and the transmitting network device "24" 12 can detect the intercepting acknowledgement message 30 and in response determine that the intercepting network device "12" can forward the wireless data packet 16 in operation 58 following updating the destination address field 26 with the IP address of the next-hop device "11" 12 that is "downstream" of the intercepting network device "12" 12 in the hop-by-hop path "12-11-21" specified in the source routing header 20.

A variation in operation 56 is the multi-hop bypass, illustrated in FIG. 4B, where multiple "downstream" promiscuously detecting network devices (e.g., "11" and/or "12") can contend for the intercepted forwarding of the wireless data packet 16. In particular, the processor circuit 42 of each of the intercepting network devices (e.g., "11" and/or "12") in operation 56 can determine the hop count between the targeted device "23" and the corresponding intercepting network device 12: the intercepting network device "12" can determine it has a corresponding hop count of "1" (HC_12=1) from the targeted device "23", whereas the intercepting device "11" can determine it has a corresponding hop count of "2" (HC_11=2) from the targeted device "23"; hence, the processor circuit 42 of each intercepting network device can accelerate its corresponding intercepting acknowledgement message 30 based on the corresponding hop count.

As illustrated in FIG. 4B, the processor circuit 42 of the intercepting network device "11" in operation 56 can transmit the intercepting acknowledgement message "ACK 11→24" 30a following the minimum delay "D1" (following completed transmission of the wireless data packet 16), for example based on dividing the SIFS interval (or prescribed delay "PD") by the hop count. In contrast, the processor circuit 42 of the intercepting network device "12" in operation 56 can transmit the intercepting acknowledgement message "ACK 12→24" 30b following the delay "D2" (following completed transmission of the wireless data packet 16, expiration of the delay "D1", and completed transmission of the intercepting acknowledgement message 30a), for example based on dividing the SIFS interval (or prescribed delay "PD") by the hop count, or at least before expiration of the SIFS interval (or prescribed delay "PD"); alternately, the intercepting network device "12" can be configured for initiating transmission of the intercepting acknowledgement message 30 after the minimum delay "D1" following completed transmission of the intercepting acknowledgement message 30a.

Hence, the network devices "12", "23", and "24" 12 can determine that the network device "11" promiscuously detected the wireless data packet 16 in response to detecting the intercepting acknowledgement message 30a; the network devices "23" and "24" can determine that the network device "12" promiscuously detected the wireless data packet 16 in response to detecting the intercepting acknowledgement message 30b. Hence, the intercepting network device "11" 12 in operation 58 can complete intercepted forwarding by updating the destination address field 26 to specify the IP address for the next-hop network device "21", and transmitting the updated wireless data packet 16 to the next-hop network device "21" 12.

According to example embodiments, unnecessary transmissions of a wireless data packet can be minimized based on a "downstream" network device, identified within the hop-by-hop path specified in the source route header of the wireless data packet, initiating intercepted forwarding of the wireless data packet that enables one or more "upstream" network device transmissions to be bypassed. The example embodiments improve efficiency by minimizing power consumption in an LLN network, based on minimizing unnecessary power consumption.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
promiscuously detecting, by a network device in a wireless data network, a wireless data packet transmitted by a transmitting network device, the wireless data packet comprising a source route header specifying a hop-by-hop path for reaching a destination device in the wireless data network, the wireless data packet further comprising a destination address field specifying a first next-hop device targeted for reception of the wireless data packet, the promiscuously detecting including the network device initiating processing of the wireless data packet regardless of a value in the destination address field;
determining from the source route header, by the network device, that the network device is identified in the hop-by-hop path as following the first next-hop device targeted in the destination address field for reception of the wireless data packet; and
executing intercepted forwarding of the wireless data packet, by the network device, to a second next-hop device successively following the network device in the hop-by-hop path, including causing the first next-hop device to suppress transmission of the wireless data packet based on the network device generating and transmitting, to the transmitting network device, an intercepting acknowledgment message before any acknowledgment by the first next-hop device to the transmitting network device, the intercepting acknowledgment message indicating reception by the network device of the wireless data packet from the transmitting network device.

2. The method of claim 1, wherein the transmitting includes transmitting the intercepting acknowledgment message prior to expiration of a short interframe spacing (SIFS) interval following completed transmission of the wireless data packet, the wireless data network implemented as a carrier sense multiple access with collision avoidance (CSMA-CA) network.

3. The method of claim 1, wherein:
the promiscuously detecting includes the network device detecting the wireless data packet within a prescribed timeslot allocated for transmission of the wireless data packet by the transmitting network device to the first next-hop device;
the transmitting includes transmitting, within the prescribed timeslot, the intercepting acknowledgment message before expiration of a prescribed acknowledgment interval allocated for the first next-hop device.

4. The method of claim 1, wherein the transmitting an intercepting acknowledgement message comprises:
determining from the hop-by-hop path a number of hops between the first next-hop device and the network device; and
accelerating transmission of the intercepting acknowledgment message, relative to a prescribed acknowledgment interval allocated for the first next-hop device targeted for reception, based on the number of hops between the first next-hop device and the network device.

5. The method of claim 1, wherein the network device operates within the wireless data network according to a non-storing mode in a tree-based topology established according to a routing protocol for low power and lossy networks.

6. An apparatus comprising:
a device interface circuit configured for promiscuously detecting, in a wireless data network, a wireless data packet transmitted by a transmitting network device, the wireless data packet comprising a source route header specifying a hop-by-hop path for reaching a destination device in the wireless data network, the wireless data packet further comprising a destination address field specifying a first next-hop device targeted for reception of the wireless data packet; and
a processor circuit configured for determining from the source route header that the apparatus is identified in the hop-by-hop path as following the first next-hop device targeted in the destination address field for reception of the wireless data packet;
the device interface circuit configured for promiscuously detecting the wireless data packet based on the device interface circuit forwarding the wireless data packet to the processor circuit, for initiating processing of the wireless data packet, regardless of a value in the destination address field;
the processor circuit further configured for executing intercepted forwarding of the wireless data packet to a second next-hop device successively following the apparatus in the hop-by-hop path, based on causing the first next-hop device to suppress transmission of the wireless data packet based on the processor circuit generating and outputting, for transmission to the transmitting network device by the device interface circuit, an intercepting acknowledgment message before any acknowledgment by the first next-hop device to the transmitting network device, the intercepting acknowledgment message indicating reception by the apparatus of the wireless data packet from the transmitting network device.

7. The apparatus of claim 6, wherein the device interface circuit is configured for transmitting the intercepting acknowledgment message prior to expiration of a short interframe spacing (SIFS) interval following completed transmission of the wireless data packet, the wireless data network implemented as a carrier sense multiple access with collision avoidance (CSMA-CA) network.

8. The apparatus of claim 6, wherein:
the device interface circuit is configured for promiscuously detecting the wireless data packet within a prescribed timeslot allocated for transmission of the wireless data packet by the transmitting network device to the first next-hop device;
the device interface circuit configured for transmitting, within the prescribed timeslot, the intercepting acknowledgment message before expiration of a prescribed acknowledgment interval allocated for the first next-hop device.

9. The apparatus of claim 6, wherein the processor circuit is configured for:
determining from the hop-by-hop path a number of hops between the first next-hop device and the apparatus; and
accelerating transmission of the intercepting acknowledgment message, relative to a prescribed acknowledgment interval allocated for the first next-hop device targeted for reception, based on the number of hops between the first next-hop device and the apparatus.

10. The apparatus of claim 6, wherein the apparatus operates within the wireless data network according to a non-storing mode in a tree-based topology established according to a routing protocol for low power and lossy networks.

11. One or more non-transitory tangible media encoded with logic for execution by a machine and when executed by the machine operable for:
promiscuously detecting, by machine implemented as a network device in a wireless data network, a wireless data packet transmitted by a transmitting network device, the wireless data packet comprising a source route header specifying a hop-by-hop path for reaching a destination device in the wireless data network, the wireless data packet further comprising a destination address field specifying a first next-hop device targeted for reception of the wireless data packet, the promiscuously detecting including the network device initiating processing of the wireless data packet regardless of a value in the destination address field;
determining from the source route header, by the network device, that the network device is identified in the hop-by-hop path as following the first next-hop device targeted in the destination address field for reception of the wireless data packet; and
executing intercepted forwarding of the wireless data packet, by the network device, to a second next-hop device successively following the network device in the hop-by-hop path, including causing the first next-hop device to suppress transmission of the wireless data packet based on the network device generating and transmitting, to the transmitting network device, an intercepting acknowledgment message before any acknowledgment by the first next-hop device to the transmitting network device, the intercepting acknowledgment message indicating reception by the network device of the wireless data packet from the transmitting network device.

12. The one or more non-transitory tangible media of claim 11, wherein the transmitting includes transmitting the intercepting acknowledgment message prior to expiration of a short interframe spacing (SIFS) interval following completed transmission of the wireless data packet, the wireless data network implemented as a carrier sense multiple access with collision avoidance (CSMA-CA) network.

13. The one or more non-transitory tangible media of claim 11, wherein:
the promiscuously detecting includes the network device detecting the wireless data packet within a prescribed timeslot allocated for transmission of the wireless data packet by the transmitting network device to the first next-hop device;
the transmitting includes transmitting, within the prescribed timeslot, the intercepting acknowledgment message before expiration of a prescribed acknowledgment interval allocated for the first next-hop device.

14. The one or more non-transitory tangible media of claim 11, wherein the transmitting an intercepting acknowledgment message comprises:
determining from the hop-by-hop path a number of hops between the first next-hop device and the network device; and
accelerating transmission of the intercepting acknowledgment message, relative to a prescribed acknowledgment interval allocated for the first next-hop device targeted for reception, based on the number of hops between the first next-hop device and the network device.

15. The one or more non-transitory tangible media of claim 11, wherein the network device operates within the wireless data network according to a non-storing mode in a tree-based topology established according to a routing protocol for low power and lossy networks.

* * * * *